United States Patent
Inukai et al.

(10) Patent No.: US 8,933,785 B2
(45) Date of Patent: Jan. 13, 2015

(54) POWER CONVERSION SYSTEM AND COMMUNICATION ADDRESS SETTING METHOD

(75) Inventors: Yoshinori Inukai, Chiyoda-ku (JP); Noboru Andou, Chiyoda-ku (JP); Isao Shikata, Chiyoda-ku (JP); Naoki Nishio, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 420 days.

(21) Appl. No.: 13/379,698

(22) PCT Filed: Jun. 24, 2009

(86) PCT No.: PCT/JP2009/061525
§ 371 (c)(1),
(2), (4) Date: Dec. 21, 2011

(87) PCT Pub. No.: WO2010/150374
PCT Pub. Date: Dec. 29, 2010

(65) Prior Publication Data
US 2012/0140534 A1  Jun. 7, 2012

(51) Int. Cl.
*H02J 13/00* (2006.01)
*H04L 29/12* (2006.01)
*H04L 12/12* (2006.01)

(52) U.S. Cl.
CPC .......... *H04L 29/12254* (2013.01); *H04L 12/12* (2013.01); *H04L 61/2038* (2013.01); *Y02B 60/34* (2013.01)
USPC ............... 340/9.1; 340/3.5; 363/72; 709/208; 709/220; 709/245

(58) Field of Classification Search
CPC ...................................... H04L 61/00–61/6095
USPC ........... 363/72; 340/9.1–9.17, 3.5–3.55, 4.21; 709/208–211, 220–226, 245; 710/110
See application file for complete search history.

(56) References Cited

U.S. PATENT DOCUMENTS 6,285,572 B1 * 9/2001 Onizuka et al. ................. 363/72
6,741,271 B1   5/2004 McConica et al.
(Continued)

FOREIGN PATENT DOCUMENTS

JP   2002-135275 A   5/2002
JP   2002-296299 A   10/2002
(Continued)

OTHER PUBLICATIONS

Sunways Photovoltaic Technology, Photovoltaic Products and Systems: Product Catalogue 2009/2010, Apr. 2009.*
(Continued)

*Primary Examiner* — Steven Lim
*Assistant Examiner* — Ryan Sherwin
(74) *Attorney, Agent, or Firm* — Buchanan Ingersoll & Rooney PC (57) ABSTRACT

There is provided a power conversion system, and a photovoltaic inverter includes a communication unit that broadcast-transmits a setting request signal of a predetermined communication address. The photovoltaic inverter includes a display unit that displays the predetermined communication address indicated by the setting request signal, and an address setting unit that generates a setting completion signal indicating that the predetermined communication address has been set as the communication address of the photovoltaic inverter if an input accepting unit accepts an input such that the predetermined communication address is set. An address management unit of the photovoltaic inverter generates a setting request signal indicating a communication address other than the predetermined communication address if the setting completion signal for the predetermined communication address is received.

4 Claims, 5 Drawing Sheets

(56) References Cited

U.S. PATENT DOCUMENTS

| | | | |
|---|---|---|---|
| 7,899,035 B2 * | 3/2011 | Eklund et al. | 370/352 |
| 8,098,659 B2 * | 1/2012 | Shida | 370/389 |
| 2007/0239860 A1 * | 10/2007 | Shirai | 709/221 |
| 2007/0252716 A1 * | 11/2007 | Burger | 340/635 |

FOREIGN PATENT DOCUMENTS

| | | |
|---|---|---|
| JP | 2003-202918 A | 7/2003 |
| JP | 2006-319942 A | 11/2006 |
| JP | 2007-259660 A | 10/2007 |
| JP | 2007-288842 A | 11/2007 |
| JP | 2007-318531 A | 12/2007 |
| JP | 2008-206241 A | 9/2008 |

OTHER PUBLICATIONS

International Search Report (PCT/ISA/210) issued on Sep. 29, 2009, by Japanese Patent Office as the International Searching Authority for International Application No. PCT/JP2009/061525.

Written Opinion (PCT/ISA/237) issued on Sep. 29, 2009, by Japanese Patent Office as the International Searching Authority for International Application No. PCT/JP2009/061525.

* cited by examiner

POWER CONVERSION SYSTEM AND COMMUNICATION ADDRESS SETTING METHOD

FIELD

The present invention relates to a power conversion system having a plurality of photovoltaic inverters (PV-inverters) and a communication address setting method.

BACKGROUND

A PV-inverter is used in a solar photovoltaic power generation system or the like. In a case where a solar photovoltaic power generation system has a large amount of power generation output, power conversion thereof cannot be done with only one PV-inverter. In such a case, a plurality of PV-inverters are connected together, and each PV-inverter performs power conversion. Thus, in a system having a plurality of PV-inverters, communication is performed among the plurality of PV-inverters in order to manage an amount of power generation of each of the plurality of PV-inverters, etc. Further, in order to communicate among the plurality of PV-inverters, communication addresses need to be set.

Conventionally, setting of a communication address has been made manually. However, manual setting is troublesome, and a setting mistake such as the same address being assigned to a plurality of PV-inverters may possibly occur. In order to solve such problems, a method for automatically setting a communication address has been known. For example, Patent Literature 1 discloses a technique such that a DHCP server automatically assigns IP addresses to devices such as a PV-inverter upon the start-up of these devices.

CITATION LIST

Patent Literature

Patent Literature 1: Japanese Patent Application Laid-open No. 2007-288842

SUMMARY

Technical Problem

However, there is a case where one desires to assign a desired communication address to each device, e.g., assigning a communication address in accordance with the installation position. However, with the method for automatically assigning a communication address as described above, a desired communication address cannot be assigned. In such a case, the communication address needs to be assigned manually, resulting in a problem that such an operation is troublesome.

The present invention has been made in view of the above, and an object of the present invention is to obtain a power conversion system and a communication address setting method capable of setting a communication address meeting a demand of a setting person without performing a troublesome operation.

Solution to Problem

In order to solve the above-mentioned problem and achieve the object, a power conversion system according to an aspect of the present invention includes a plurality of PV-inverters connected to a power-generating device and an address setting device that sets communication addresses of the PV-inverters. The address setting device includes an address management unit that generates a setting request signal of a predetermined communication address, and a transmitting unit that broadcast-transmits the setting request signal generated by the address management unit, the PV-inverter includes a receiving unit that receives the setting request signal, a display unit that displays the predetermined communication address indicated by the setting request signal, an input accepting unit that accepts, from a setting person, an input such that the predetermined communication address is set, a storing unit that stores the predetermined communication address as a communication address of the said PV-inverter if the input accepting unit accepts the input such that the predetermined communication address is set, a communication address setting unit that generates a setting completion signal indicating that the predetermined communication address has been set as the communication address of the said PV-inverter, and a transmitting unit that transmits the setting completion signal generated by the communication address setting unit to the address setting device, wherein the address setting device further comprises a receiving unit that receives the setting completion signal, and the address management unit of the address setting device generates the setting request signal indicating a communication address other than the predetermined communication address if the receiving unit of the address setting device receives the setting completion signal for the predetermined communication address.

A communication address setting method according to another aspect of the present invention, is employed in a system including a plurality of PV-inverters connected to a power-generating device and an address setting device that sets communication addresses of the PV-inverters. The method includes a generating step of generating a setting request signal of a predetermined communication address by an address management unit of the address setting device, a transmitting step of broadcast-transmitting the setting request signal generated in the generating step by a transmitting unit of the address setting device, a receiving step of receiving the setting request signal by a receiving unit of the PV-inverter, a displaying step of displaying the predetermined communication address indicated by the setting request signal by a display unit of the PV-inverter, an input accepting step of accepting, from a setting person, an input such that the predetermined communication address is set by an input accepting unit of the PV-inverter, a storing step of storing, by a communication address setting unit of the PV-inverter, the predetermined communication address as a communication address of the said PV-inverter in a storing unit if the input such that the predetermined communication address is set is accepted in the input accepting step, a communication address setting step of generating, by the communication address setting unit of the PV-inverter, a setting completion signal indicating that the predetermined communication address has been set as the communication address of the said PV-inverter, a transmitting step of transmitting the setting completion signal generated in the communication address setting step to the address setting device by a transmitting unit of the PV-inverter, and a receiving step of receiving the setting completion signal by a receiving unit of the address setting device, wherein in the generating step, the setting request signal indicating a communication address other than the predetermined communication address is generated if the setting completion signal for the predetermined communication address is received in the receiving step.

Advantageous Effects of Invention

According to the present invention, there is obtained an effect such that a communication address meeting a demand of a setting person can be set without performing a troublesome operation.

DESCRIPTION OF EMBODIMENTS

An embodiment of a power conversion system and a communication address setting method according to the present invention will be described below in detail with reference to drawings. Note that the present invention is not limited to this embodiment.

Embodiment

Figure 1:
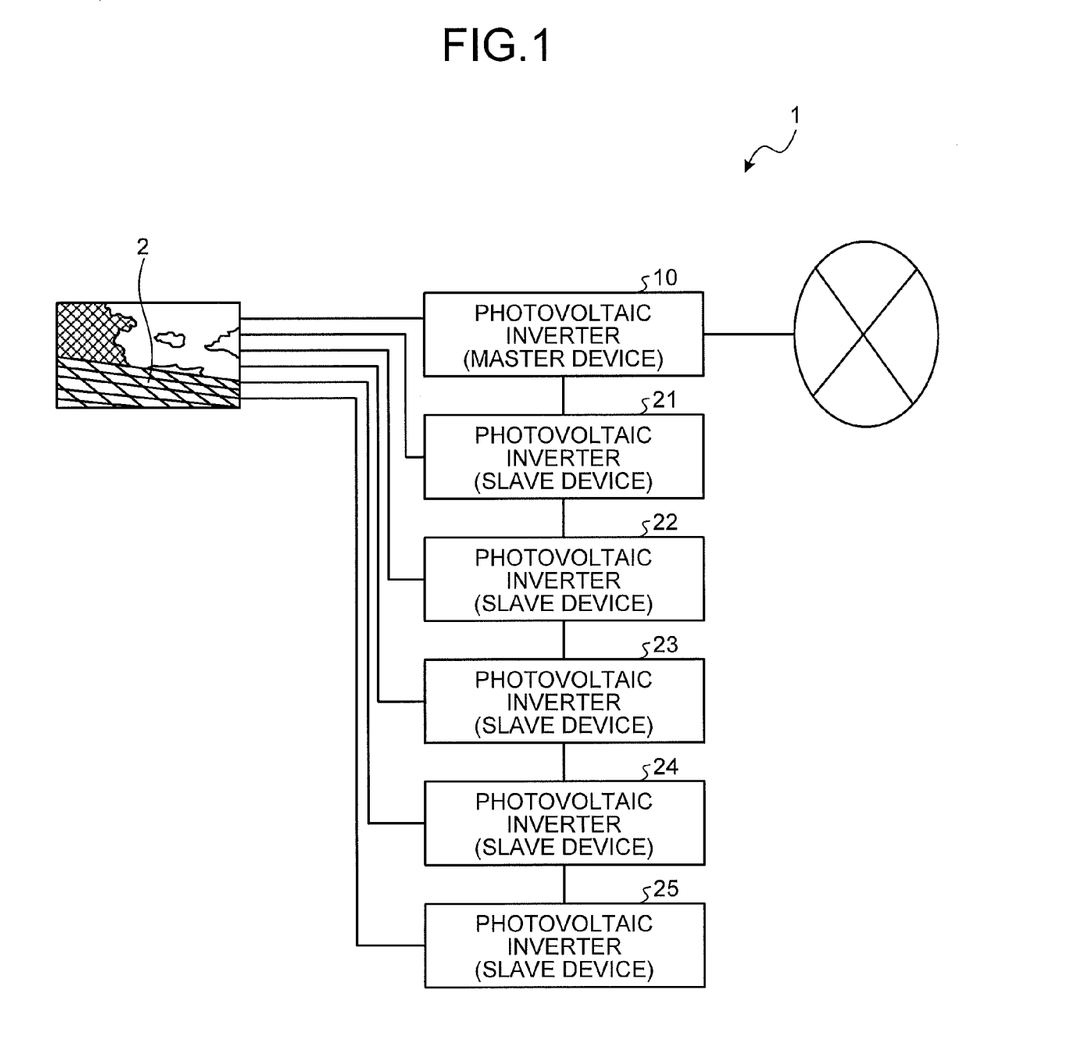
FIG. 1 is a diagram showing an overall configuration of a power conversion system 1 according to an embodiment.

FIG. 1 is a diagram showing an overall configuration of a power conversion system 1 according to an embodiment. The power conversion system 1 mainly includes a solar cell module 2 as a power-generating device, and a plurality of PV-inverters 10 and 21 to 25. The solar cell module 2 receives sunlight and generates a direct current. The PV-inverters 10 and 21 to 25 convert the direct current obtained by the solar cell module 2 to an alternating current. Further, the PV-inverters 10 and 21 to 25 are connected in series by a dedicated line, and the PV-inverters 10 and 21 to 25 can communicate with one another through the dedicated line. Note that the connection configuration of the dedicated line is not limited to the present embodiment. As another example, the PV-inverters 10 and 21 to 25 may perform wireless communication.

The PV-inverter 10 functions as a master device, and the PV-inverters 21 to 25 function as slave devices. The PV-inverter 10 obtains and manages information regarding the amounts of power generation of the PV-inverters 21 to 25, and the like, through the dedicated line. Further, the master device 10 is connected to a network such as the Internet, and transmits and receives information to and from another device such as a server. Hereinafter, the PV-inverter 10 is referred to as the master device 10, and the PV-inverters 21 to 25 are referred to as the slave devices 21 to 25. The master device 10 sets a communication address of each device in order to perform communication between the master device 10 and the slave devices 21 to 25. That is, the master device 10 corresponds to an address setting device for setting communication addresses of the PV-inverters 10 and 21 to 25.

Figure 2:
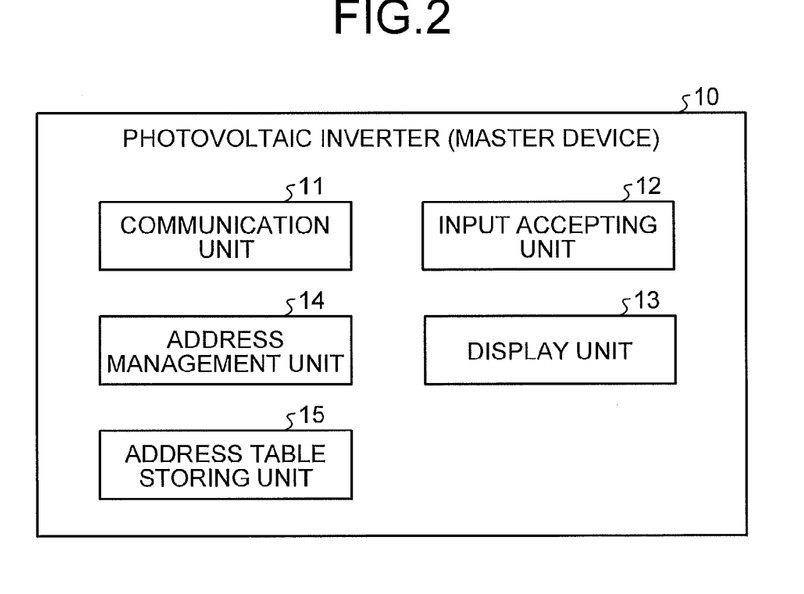
FIG. 2 is a block diagram showing a major configuration of a master device 10 relating to a communication address setting process.

FIG. 2 is a block diagram showing a major configuration of the master device 10 relating to a communication address setting process. The master device 10 includes a communication unit 11, an input accepting unit 12, a display unit 13, an address management unit 14, and an address table storing unit 15. The communication unit 11 transmits and receives data to and from the slave devices 21 to 25. The input accepting unit 12 is an operation panel, for example, and accepts an input of information from a setting person. The display unit 13 displays various information.

The address management unit 14 manages the setting of communication addresses for the slave devices 21 to 25. The address table storing unit 15 stores an address table associating the communication addresses of the slave devices 21 to 25 with identification information for identifying the slave devices 21 to 25.

Figure 3:
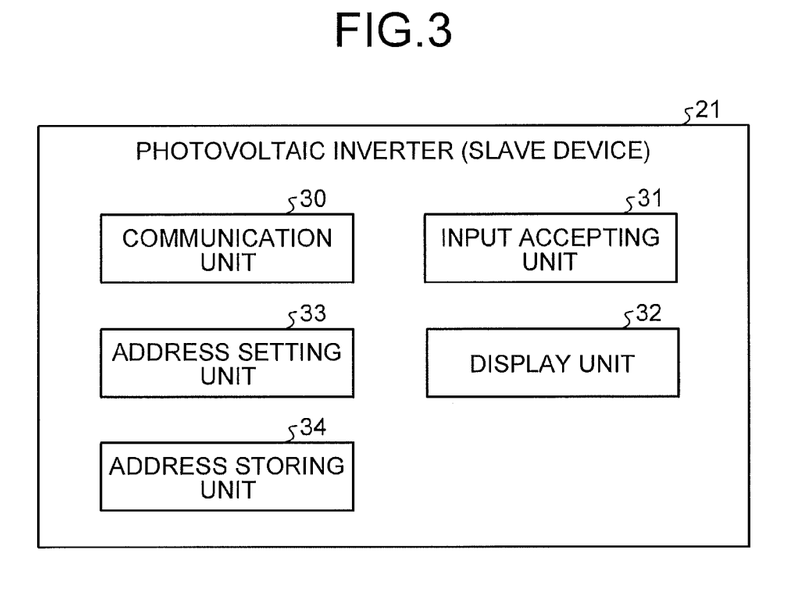
FIG. 3 is a block diagram showing a major configuration of a slave device 21 relating to a communication address setting process.

FIG. 3 is a block diagram showing a major configuration of the slave device 21 relating to a communication address setting process. The slave device 21 includes a communication unit 30, an input accepting unit 31, a display unit 32, an address setting unit 33, and a set address storing unit 34. The communication unit 30 transmits and receives information to and from other devices connected through the dedicated line, i.e., the master device 10 and the slave device 22. The input accepting unit 31 is an operation panel, for example, and accepts an input of information from a setting person. The display unit 32 displays various information.

The address setting unit 33 sets a communication address of the slave device 21 in accordance with an input from the input accepting unit 31. The address storing unit 34 stores the communication address of the slave device 21 set by the address setting unit 33. Note that the configurations of the other slave devices 22 to 25 are similar to that of the slave device 21.

Figure 4:
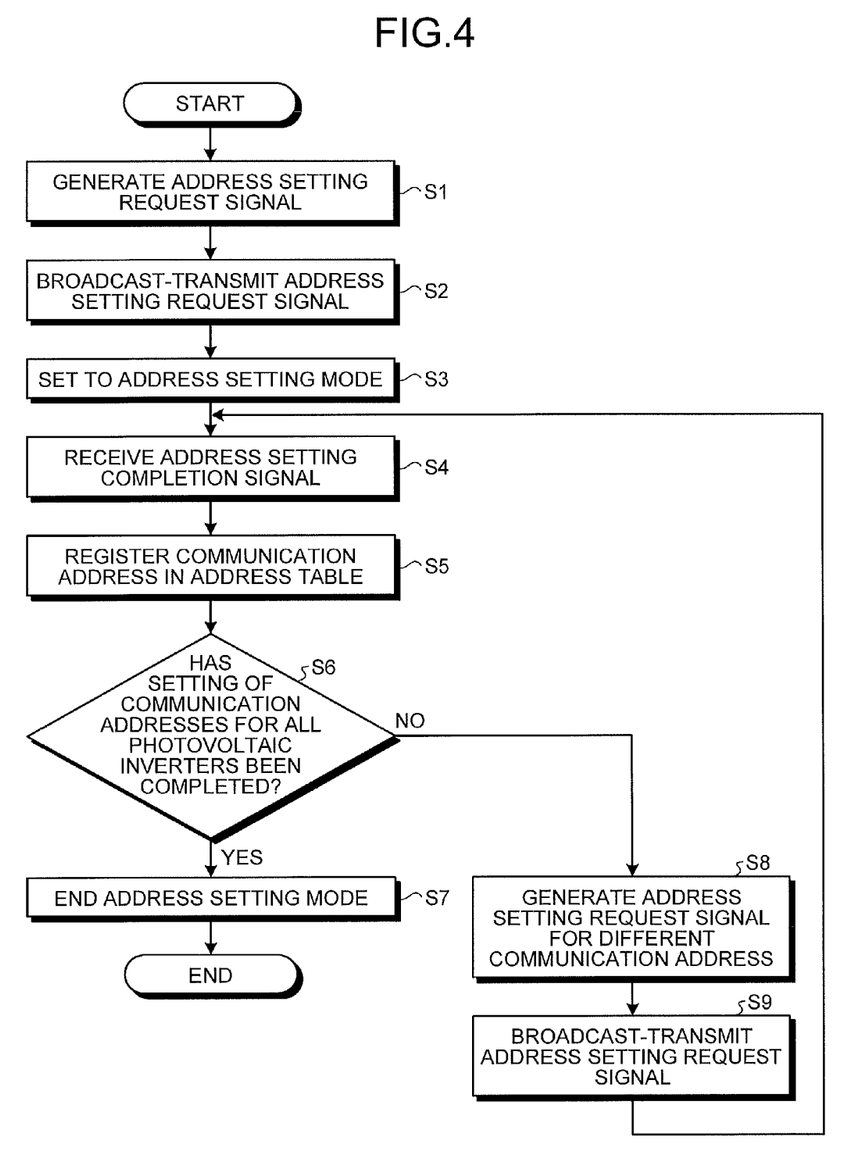
FIG. 4 is a flow chart showing the communication address setting process by the master device 10.

FIG. 4 is a flow chart showing the communication address setting process by the master device 10. The address management unit 14 of the master device 10 first generates an address setting request signal (step S1). Here, the address setting request signal includes an arbitrary communication address to be set. Next, the communication unit 11 broadcast-transmits the address setting request signal to all of the slave devices 21 to 25 (step S2). Further, the address management unit 14 sets an operation mode to an address setting mode (step S3).

In one of the slave devices 21 to 25, the communication address included in the address setting request signal transmitted by the master device 10 is set as a communication address of the slave device. When a communication address is set in one of the slave devices, the communication unit 11 receives an address setting completion signal from the slave device whose communication address setting has been completed (step S4). The address setting completion signal contains the set communication address and identification information for identifying the slave device having transmitted the address setting completion signal.

When the communication unit 11 receives the address setting completion signal, the address management unit 14 stores the identification information and the communication address contained in the address setting completion signal in association with each other in an address table of the address table storing unit 15 (step S5).

Note that a communication address may not be contained in the address setting completion signal as another example. In such a case, the master device 10 may store a communication address indicated by the address setting request signal currently having been transmitted, and may store the stored communication address and identification information contained in the address setting completion signal in association with each other upon receipt of the address setting completion signal.

If setting of communication addresses for all of the PV-inverters included in the power conversion system 1 is completed with the above-described processes (step S6, Yes), the address setting mode is ended (step S7) and the communication address setting process is completed. In the process of ending the address setting mode, the communication unit 11 broadcast-transmits an end signal indicating the ending of the address setting mode in response to an instruction by the address management unit 14. Further, the address management unit 14 sets the operation mode of the master device 10 from the address setting mode to a normal mode.

If setting of communication addresses for all of the PV-inverters has not been completed yet in step S6 (step S6, No), the address management unit 14 generates an address setting request signal containing a communication address other than the communication addresses already assigned to the PV-inverters, i.e., the communication addresses already registered in the address table storing unit 15 (step S8). Next, the communication unit 11 broadcast-transmits the address setting request signal generated by the address management unit 14 (step S9). Then, the process proceeds to step S4 again, and performs a process regarding the setting of the communication address contained in the transmitted address setting request signal.

As described above, in the master device 10, if an address setting request signal of a predetermined communication address is broadcast-transmitted and this communication address is set to a predetermined slave device, an address setting request signal of a communication address other than the set communication addresses is transmitted. Thus, since the master device 10 does not transmit the address setting request signal for the communication address already assigned in the predetermined slave device, there is no need to check whether or not a communication address duplicates with those of the other devices on the side of the slave device. Thus, it is possible to eliminate the problem such that the same communication address is set to a plurality of slave devices.

Figure 5:
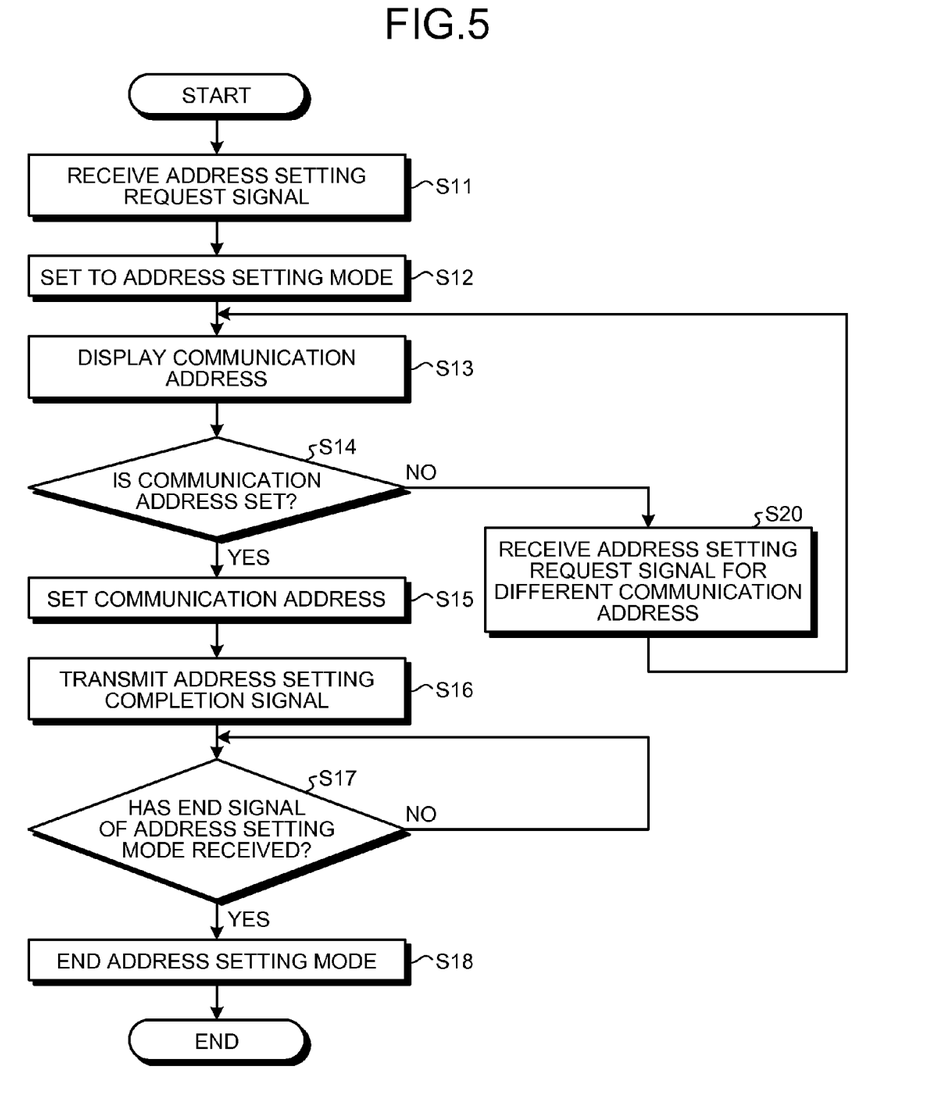
FIG. 5 is a flow chart showing the communication address setting process by the slave device 21.

FIG. 5 is a flow chart showing the communication address setting process by the slave device 21. The communication unit 30 of the slave device 21 receives the address setting request signal broadcast-transmitted from the master device 10 (step S11). When the address setting request signal is received, the address setting unit 33 of the slave device 21 sets the operation mode to the address setting mode (step S12). Next, the address setting unit 33 displays the communication address contained in the address setting request signal on the display unit 32 (step S13). The setting person checks the communication address displayed on the display unit 32, and if the setting person wants to set the communication address as a communication address of the slave device 21, the communication address being displayed can be selected via the operation panel, or the like.

If the communication address being displayed is selected by the setting person, i.e., if the input accepting unit 31 accepts, from the setting person, an input such that the communication address being displayed is set as the communication address of the slave device 21 (step S14, Yes), the address setting unit 33 sets the communication address for which the input has been accepted as the communication address of the slave device 21 (step S15). Specifically, the address setting unit 33 stores the communication address selected by the setting person in the address storing unit 34. Then, an address setting completion signal indicating that the communication address of the slave device 21 has been set is transmitted to the master device 10 (step S16). When the communication unit 30 receives an end signal of the address setting mode from the master device 10 (step S17, Yes), the address setting mode is ended (step S18), and the communication address setting process is completed.

Note that while the communication unit 11 may receive address setting request signals for other communication addresses after the setting of the communication address (step S15), the address management unit 14 does not display the communication addresses indicated by these address setting request signals on the display unit 32 during this period. Thus, the address management unit 14 can inform the setting person that a communication address has already been set to the slave device 21.

In step S14, if the communication address is not set (step S14, No), the process stands by still. Then, if the communication unit 11 receives a new address setting request signal (step S20), the process proceeds to step S13. Note that a communication address contained in the address setting request signal received in step S20 is an unregistered communication address which has not been set yet in any of the PV-inverters.

Note that communication address setting processes by the other slave devices 22 to 25 are similar to the communication address setting process by the slave device 21 described with reference to FIG. 5.

As described above, since the slave device 21 receives only a communication address not duplicating with those of the other PV-inverters under the management by the master device 10, it is possible to avoid the setting of a communication address duplicating with those of the other devices without checking the presence or absence of the duplication of the communication address. Further, since the communication address transmitted by the master device 10 is displayed on the display unit 32, it is only necessary that the setting person checks the communication address and makes an input for setting only when the setting person wants to set the communication address being displayed as the communication address of the slave device 21. Accordingly, the setting person can set a desired communication address without caring whether or not the communication address desired to set is duplicated with communication addresses of the other PV-inverters.

Figure 6:
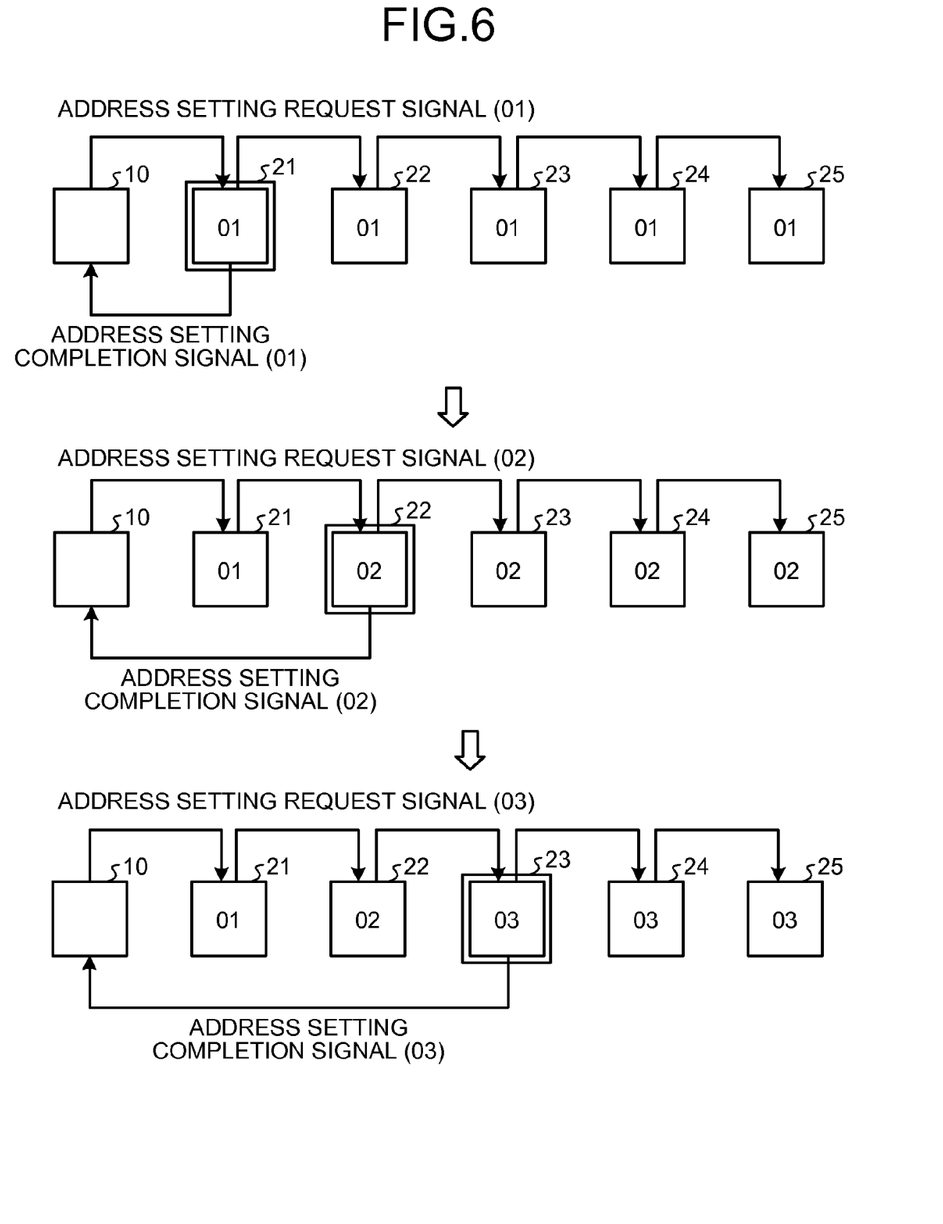
FIG. 6 is a diagram schematically showing how communication addresses are set to a plurality of PV-inverters.

FIG. 6 is a diagram schematically showing how communication addresses are set to a plurality of PV-inverters in accordance with the communication address setting process. Note that the master device 10 herein issues a serial number in order as a communication address, i.e., "01," "02," and "03." First, as shown in the upper section of FIG. 6, the master device 10 initially broadcast-transmits an address setting request signal for the communication address "01" to all of the slave devices 21 to 25. As a result, the communication address "01" is displayed on all of the display units of the slave devices 21 to 25.

When the setting person wants to assign the communication address "01" to the slave device 21, the setting person makes an input such that the communication address "01" is set to the slave device 21 through the input accepting unit 31 of the slave device 21. Accordingly, the address setting unit 33 of the slave device 21 stores the communication address "01" as the communication address of the slave device 21 in the address storing unit 34 of the slave device 21. Further, the address setting unit 33 transmits an address setting completion signal for the communication address "01" to the master device 10 via the communication unit 30. Upon receipt of the address setting completion signal, the master device 10 registers the identification information of the slave device 21 and the communication address "01" in association with each other in the address table of the address table storing unit 15. Thus, the setting of the communication address "01" is completed.

Subsequently, as shown in the middle section of FIG. 6, the master device 10 broadcast-transmits an address setting request signal for the communication address "02." As a result, the communication address "02" is displayed on the display units of the slave devices 22 to 25, excluding the slave device 21 to which the communication address "01" has already been set. Note that the communication address "01" which has already been set is displayed on the display unit 32 of the slave device 21.

Then, in order to assign the communication address "02" to the slave device 22, the setting person makes an input such that the communication address "02" is set to the slave device 22 through the input accepting unit 31 of the slave device 22. Accordingly, the communication address setting unit of the slave device 22 stores the communication address "02" as the communication address of the slave device 22 in the address storing unit of the slave device 22, and transmits an address setting completion signal for the communication address "02" to the master device 10. The master device 10 registers the identification information of the slave device 22 and the communication address "02" in association with each other in the address table of the address table storing unit 15. Thus, the setting of the communication address "02" is completed.

Further, as shown in the lower section of FIG. 6, the master device 10 broadcast-transmits an address setting request signal for the communication address "03". As a result, the communication address "03" is displayed on the display units of the slave devices 23 to 25, excluding the slave devices 21 and 22 to which the communication addresses have already been set. Note that the communication addresses "01" and "02" which have already been set are displayed respectively on the display unit 32 of the slave device 21 and the display unit of the slave device 22.

If the communication address "03" is selected in the slave device 23, the communication address "03" is set as the communication address of the slave device 23 in the slave device 23, and an address setting completion signal for the communication address "03" is transmitted from the slave device 23 to the master device 10. In the master device 10, the identification information of the slave device 23 and the communication address "03" are stored in association with each other in the address table of the address table storing unit 15, and the setting of the communication address "03" is completed.

As described above, the master device 10 sequentially transmits an address setting request signal for a different communication address. In the slave device to which the setting person wants to set the communication address, the setting person makes an input for setting the communication address. As a result, the communication address meeting a demand of the setting person can be set semi-automatically without duplication.

As a first modified example, while the PV-inverter 10 as a master device is operated as an address setting device in the present embodiment, the power conversion system 1 may include an address setting device as a device different from the PV-inverter as another example. Note that the configurations and processes of the address device and the PV-inverter in such a case are similar to the configurations and operations of the master device 10 and the slave devices 21 to 25 according to the embodiment, respectively.

REFERENCE SIGNS LIST

1 POWER CONVERSION SYSTEM
2 SOLAR CELL MODULE
10, 21 to 25 PV-INVERTER
11 COMMUNICATION UNIT
12 INPUT ACCEPTING UNIT
13 DISPLAY UNIT
14 ADDRESS MANAGEMENT UNIT
15 ADDRESS TABLE STORING UNIT
30 COMMUNICATION UNIT
31 INPUT ACCEPTING UNIT
32 DISPLAY UNIT
33 ADDRESS SETTING UNIT
34 ADDRESS STORING UNIT

The invention claimed is:

1. A power conversion system including a plurality of photovoltaic inverters connected to a power-generating device and an address setting device that sets communication addresses of the photovoltaic inverters,
the address setting device comprising:
an address management unit that generates a setting request signal of a predetermined communication address; and
a transmitting unit that broadcast-transmits the setting request signal generated by the address management unit to the plurality of photovoltaic inverters,
at least one of the plurality of photovoltaic inverters comprising:
a receiving unit that receives the setting request signal;
a display unit that displays the predetermined communication address indicated by the setting request signal;
an input accepting unit that accepts, from a setting person, an input such that the predetermined communication address is set;
a storing unit that stores the predetermined communication address as a communication address of the photovoltaic inverter if the input accepting unit accepts the input such that the predetermined communication address is set;
a communication address setting unit that generates a setting completion signal indicating that the predetermined communication address has been set as the communication address of the at least one photovoltaic inverter; and
a transmitting unit that transmits the setting completion signal generated by the communication address setting unit to the address setting device, wherein
the address setting device further comprises a receiving unit that receives the setting completion signal, and
the address management unit of the address setting device generates the setting request signal indicating a communication address other than the predetermined communication address if the receiving unit of the address setting device receives the setting completion signal for the predetermined communication address.

2. The power conversion system according to claim 1, wherein when the receiving unit receives the setting request signal, the display unit of the photovoltaic inverter does not display the communication address indicated by the setting request signal received by the receiving unit if a communication address of the at least one photovoltaic inverter has already been stored in the storing unit.

3. The power conversion system according to claim 2, wherein when the receiving unit receives the setting request signal, the display unit of the at least one photovoltaic inverter displays the communication address of the photovoltaic inverter if the communication address of the at least one photovoltaic inverter has already been stored in the storing unit.

4. A communication address setting method in a system including a plurality of photovoltaic inverters connected to a power-generating device and an address setting device that sets communication addresses of the photovoltaic inverters, the method comprising:
- a generating step of generating a setting request signal of a predetermined communication address by an address management unit of the address setting device;
- a transmitting step of broadcast-transmitting the setting request signal generated in the generating step by a transmitting unit of the address setting device to the plurality of photovoltaic inverters;
- a receiving step of receiving the setting request signal by a receiving unit of a photovoltaic inverter of the plurality of photovoltaic inverters;
- a displaying step of displaying the predetermined communication address indicated by the setting request signal by a display unit of the photovoltaic inverter;
- an input accepting step of accepting, from a setting person, an input such that the predetermined communication address is set by an input accepting unit of the photovoltaic inverter;
- a storing step of storing, by a communication address setting unit of the photovoltaic inverter, the predetermined communication address as a communication address of the photovoltaic inverter in a storing unit if the input such that the predetermined communication address is set is accepted in the input accepting step;
- a communication address setting step of generating, by the communication address setting unit of the photovoltaic inverter, a setting completion signal indicating that the predetermined communication address has been set as the communication address of the photovoltaic inverter;
- a transmitting step of transmitting the setting completion signal generated in the communication address setting step to the address setting device by a transmitting unit of the photovoltaic inverter; and
- a receiving step of receiving the setting completion signal by a receiving unit of the address setting device, wherein
- in the generating step, the setting request signal indicating a communication address other than the predetermined communication address is generated if the setting completion signal for the predetermined communication address is received in the receiving step.

* * * * *